April 7, 1970     W. B. WETZ ET AL     3,504,402
EXTRUSION ADAPTOR
Original Filed Nov. 5, 1965
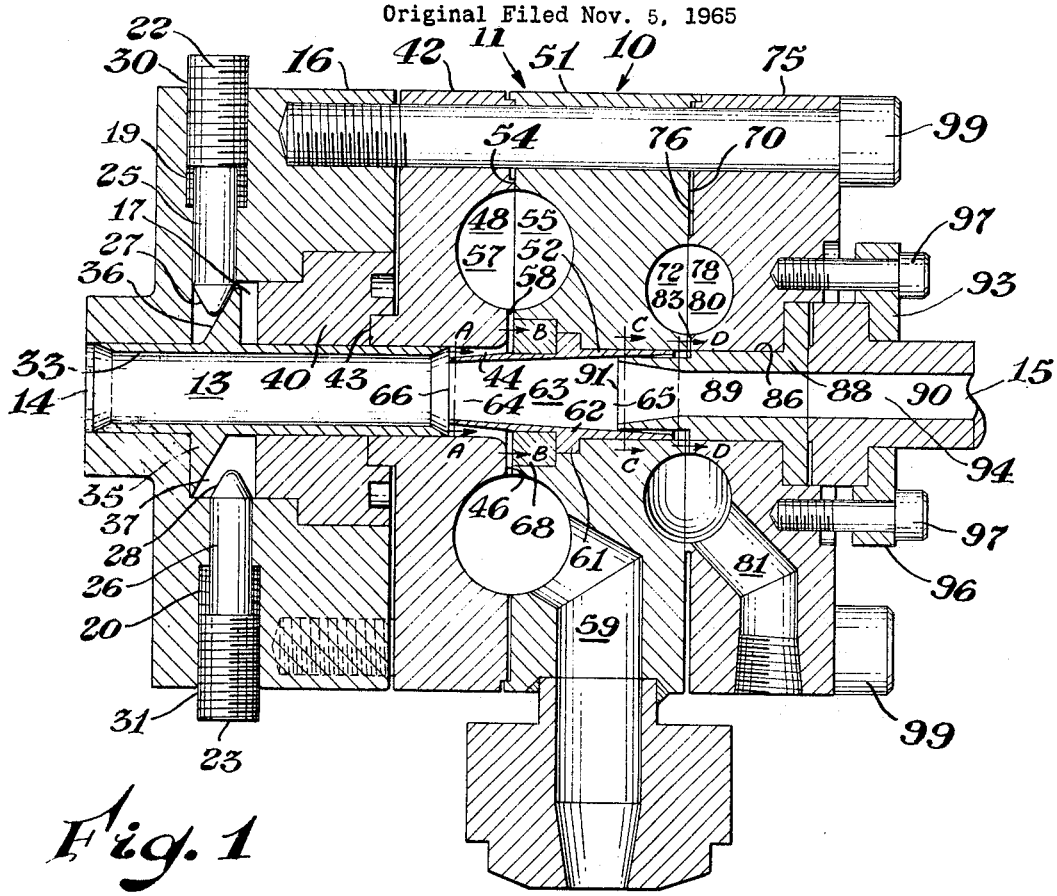
Fig. 1
Fig. 2
Fig. 3
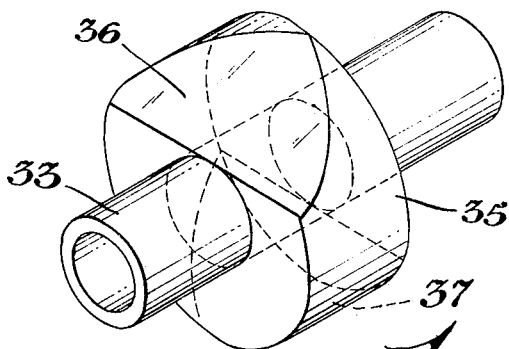
Fig. 4
INVENTORS.
William Ben Wetz
Lloyd Edward Lefevre
Arthur Lee Leasher
Roger Lee Briggs
BY Robert B. Ingraham
AGENT United States Patent Office 3,504,402
Patented Apr. 7, 1970

3,504,402
EXTRUSION ADAPTOR
William Ben Wetz, Findlay, Ohio, and Lloyd Edward Lefevre, Bay City, Arthur Lee Leasher, Freeland, and Roger Lee Briggs, Midland, Mich., assignors to The Dow Chemical Company, Midland, Mich., a corporation of Delaware
Original application Nov. 5, 1965, Ser. No. 506,555. Divided and this application Jan. 5, 1968, Ser. No. 705,877
Int. Cl. B29f 3/00
U.S. Cl. 18—13    6 Claims

ABSTRACT OF THE DISCLOSURE

An adjustable extrusion adaptor is provided wherein two or more concentrically arranged streams are provided, the outer layers coming from an annular inwardly extruding orifice. Variable back pressure is provided for the outermost stream by an adjustably mounted sleeve.

---

This application is a divisional application of our copending application Ser. No. 506,555, filed Nov. 5, 1965, now Patent No. 3,451,784.

This invention relates to an improved extrusion adaptor and more particularly relates to an improved extrusion adaptor for the preparation of multi-layer film.

In British Patent 985,310 an apparatus is disclosed for the production of multi-layer film by the coextrusion of two or more diverse heat-plastified synthetic resinous organic materials as a plurality of parallel layers within a die and the subsequent extrusion of the layered stream from an extrusion orifice to provide a multi-layer film of diverse thermoplastic resinous components. Subsequently it has been discovered that if a circular composite stream of synthetic resinous materials is fed to a sheeting die, a layered film is extruded when stream line flow is maintained. Beneficially such a composite stream having a generally circular cross section can contain one or more streams of heat-plastified synthetic resinous material therein having a generally elongate configuration, the composite stream passed to a die of the sheeting variety having an elongated extrusion slot and when the elongated stream within the circular stream are maintained generally parallel to the rectangular slot, a multi-layer sheet or film is extruded wherein the inner streams extend almost the entire width of the extrusion die slot. Generally in the extrusion of synthetic resinous thermoplastic film, it is necessary to remove and discard as scrap a narrow portion of the outer edge of the film in order to provide a product having the desired thickness uniformity in the transverse direction of the film, the transverse direction being the direction in the plane of the film generally normal to the direction of extrusion or machine direction.

Beneficially, in the extrusion of composite streams oftentimes the circumstances, depending upon the type of the material being extruded, temperatures, uniformity required for the particular application and indeed batch-to-batch variations in the polymeric material employed for the outer stream and the inner stream, the distance between the terminal portion of the inner layer and the extreme edge of the extruded sheet will vary. Such variation is often inconvenient and indeed expensive as it requires readjustment of the edge trimming apparatus and oftentimes necessitates the production of film having a width less than is desirable, that is, the selvage or edge scrap will vary in a desired manner. Frequently, it is desired to trim the edge of such composite film in such a manner that only portions of the outer layer are removed and such portions may be recycled and extruded without danger of contamination with a material from the inner layer which oftentimes is incompatible with material of the outer or other layers.

It would be beneficial if there were available an extrusion adaptor which would permit the extrusion of multi-layer film employing a sheeting die which would permit ready variation of the width of an inner layer within the extruded film.

It would also be beneficial if there were available such an extrusion adaptor which was mechanical, relatively simple, and easily adjusted.

These benefits and other advantages in accordance with the present invention are achieved in an extrusion adaptor suitable to provide connection between two or more sources of heat-plastified synthetic resinous material and a sheeting die, the adaptor comprising a housing defining a first passageway, the first passageway having a polymer inlet end and a polymer outlet end, the outlet end adapted to be in operative communication with a sheeting die, the housing defining at least one generally annular plenum, a second polymer inlet passageway in communication with the annular plenum, an annular passageway communicating with the first or central passageway and the annular plenum and adapted to supply material to the first passageway by radially inward flow from the annular plenum, a bushing disposed within the central passageway having an orifice of generally elongated cross-sectional configuration in a plane normal to the axis of the first passageway, the bushing defining a bushing passageway providing communication between the discharge end of the first passageway and the inlet end of the first passageway, a restriction means adjustably mounted within the central passageway and on adjustment adapted to selectively constrict a space defined between the bushing and the inner wall of the central passageway adjacent the terminal portions of the elongate passageway. Also contemplated within the scope of the present invention is a method for the simultaneous extrusion of multi-layer synthetic resinous thermoplastic film wherein a generally composite stream of diverse heat plastified synthetic resinous materials is fed to a sheeting die, and subsequently extruded in the form of a sheet wherein the composite stream is spread by the die to a multi-layer configuration and the composite stream has encapsulated therein sub-streams of diverse synthetic resinous material of a generally elongate cross sectional configuration, the improvement which comprises varying the position of the edges of at least one of the sub-streams within the composite stream while in an unspread form to obtain the desired degree of spreading of at least one of the sub-streams within the sheeting die.

Further features and advantages of the present invention will become more apparent from the following specification when taken in connection with the drawing wherein:

FIGURE 1 is a cross-sectional view of an extrusion adaptor in accordance with the present invention.

FIGURE 2 is a schematic representation of a section of a bushing of FIGURE 1 taken along the line A—A and a second bushing taken along the line C—C.

FIGURE 3 is a schematic representation of a section of a bushing of the apparatus of FIGURE 1 taken along the line B—B and of a section of the bushing taken along the line D—D of FIGURE 1.

FIGURE 4 is an isometric representation of the restrictor of the adaptor of FIGURE 1.

In FIGURE 1 there is illustrated an extrusion adaptor in accordance with the present invention generally designated by the reference numeral 10. The extrusion adaptor 10 comprises a housing 11 defining a central passageway 13. The central passageway 13 has a discharge end 14 and an inlet end 15. The housing 11 comprises a first housing portion 16. The first housing portion 16 defines a generally centrally located shouldered cylindrical cavity 17 which in part serves to define a portion of the central passageway 13. The housing portion 16 defines a pair of generally opposed internally threaded radially extending cavities 19 and 20. Disposed within the cavities 19 and 20 are adjusting screws 22 and 23, respectively. Each of the adjusting screws 22 and 23 has a generally cylindrical pin 25 and 26, respectively. The pins 25 and 26 terminate in generally conical ends 27 and 28, respectively, remotely disposed from externally threaded portions 30 and 31 which threadably engage the internally threaded cavities 19. A sleeve 33 is partially disposed within the cavity 17 and within a portion of the central passageway 13. The sleeve 33 has a generally cylindrical configuration and defines an outwardly extending generally annular collar 35 defining a first camming surface 36 and a second camming surface 37. The camming surfaces 36 and 37 are adapted to engage the conical points 27 and 28 of the adjusting screws 22 and 23, respectively. A packing 40 is disposed within a portion of the shouldered cavity 17 in such a manner that sufficient space is provided for the sleeve 33 to be moved a limited distance in a direction in a line along the axis of the central passageway 13. A second body portion 42 is in sealing engagement with the first body portion 16. The body portion 42 defines a first face 43 which extends generally radially outwardly and is in sealing engagement with the packing 40. The body portion 42 defines a generally centrally disposed passageway 44 which forms a part of the central passageway 13. The body portion 42 defines a generally outwardly extending face 46 which is remotely disposed from the face 43. The face 46 has defined therein a generally annular cavity 48. A third body portion 51 is disposed generally adjacent the second body portion 42. The third body portion 51 defines a centrally disposed passageway 52 which forms a portion of the central passageway 13. The third body portion 51 defines a radially outwardly extending face 54 which has defined therein a generally annular cavity 55. The annular cavity 55 in cooperation with the annular cavity 48 defines a first plenum 57. The faces 46 and 54 between the annular passageways 48 and 55 and the central passageway 13 define a generally annular passageway 58 which provides communication between the central passageway 13 and with plenum 57. A second inlet 59 is defined by the third housing portion 51 and provides communication between the plenum 57 and a heat-plastified polymer source (not shown). In the portion 52 of the central passageway 13 is a bushing 61. The bushing 61 comprises a body portion 62 defining an internal passageway 63. The passageway 63 has a discharge end 64 and an inlet end 65. The inlet end 64 terminates in a generally elongate opening 66, whereas the inlet end 65 has a generally circular configuration. The bushing 61 is maintained in position by means of a retaining ring 68 readily secured into the third body portion 51. The third body portion 51 has a radially outwardly extending surface 70 generally remotely disposed from the surface 54. The surface 70 defines a generally annular cavity 72. A fourth body portion 75 is disposed adjacent the third body portion 51. The fourth body portion 75 defines a generally radially outwardly extending surface 76 having defined therein a generally annular cavity 78. The annular cavity 78 is adapted to mate with the annular cavity 72 of the third body portion 51 and define a second plenum 80. The fourth body portion 75 defines a third polymer inlet passageway 81 adapted to provide communication with a third polymer source (not shown) and the plenum 80. The surfaces 70 and 76 between the plenum 80 and the central passageway 13 define an annular passageway 83 providing communication between the central passageway 13 and the plenum 80. The fourth body portion 75 defines an internal passageway 86 which forms a portion of the central passageway 13. Disposed within the passageway 86 is a bushing 88 defining a generally centrally disposed passageway 89 therein. The passageway 89 has an entrance end 90 and a discharge 91. The discharge 91 has a generally elongate configuration and is generally parallel to the elongate opening 66 of the bushing 61. A retainer 93 engages the bushing 88 and maintains it in contact with the fourth body portion 75. The retainer 93 defines a passageway 94 which forms part of the central passageway 13. Retaining ring 96 engages the retainer 93 and maintains it in fixed location relative to the fourth body portion 75 by means of the bolts 97. The first, second, third and fourth body portions 16, 42, 51 and 75, respectively, are maintained in fixed relationship to each other by means of the bolts 99 extending therethrough.

FIGURE 2 schematically represents a section of the terminal portion of the bushing 61 and the terminal portion of the bushing 88 illustrating the elongate configuration of the discharge portion of the passageway as taken along the line A—A and C—C of the bushings 61 and 88, respectively.

FIGURE 3 schematically represents the configuration of the bushings 61 and 88 taken along the lines B—B and D—D, respectively.

FIGURE 4 is an isometric representation depicting the annular collar 35 and the camming surfaces 36 and 37, respectively.

In operation of the apparatus in accordance with the invention, a first thermoplastic resinous material is passed into the inlet end 15 of the passageway 13, the thermoplastic resinous material passes through the passageway 89 of the bushing 88 and is formed into a generally elongate or rectangular configuration at the discharge opening 91. A thermoplastic resinous material entering the passageway 81 of the fourth body portion 75 enters the plenum 80, passes through the generally annular passageway 83 which surrounds the portion of the bushing 88 remote from the fourth body portion 75 and encapsulates the generally rectangular stream issuing from the opening 91, forming a composite stream within the passageway 63 of the bushing 61. The composite stream is subsequently discharged from the elongate opening 66 of the bushing 61. A stream of heat-plastified thermoplastic resinous material entering the passageway 59 of the third body portion 51 enters the annular plenum 57 and passes through the annular passageway 58 providing a generally annular stream surrounding the terminal portion of the bushing 61 disposed within the second body portion 62 which in turn encapsulates the composite stream issuing from the terminal portion or opening 66 of the bushing 61. Thus, immediately after the stream issues from the opening 66 of the bushing 61, the total composite stream has a generally circular configuration containing therein a hollow rectangle of the material from plenum 80 and a solid rectangle of material from the inlet end 15. The extrusion adaptor 10, when in cooperative combination with a sheeting die wherein the die has its extrusion slot parallel to the direction of the generally elongate orifices 66 and 91 of the bushings 61 and 88, respectively, has issuing therefrom what in essence is a five-layer film, that is, an inner layer of the material entering the inlet 15 encapsulated within a layer of material from a plenum 80 which in turn is encapsulated within material from the plenum 57. Adjustment of the screws 22 and 23 positions the sleeve or restrictor 33 toward or away from the opening 66 of the bushing 61. As the sleeve 33 approaches the bushing 61, the passageway 44 lying between the bushing 61 and the second housing portion 52 is restricted or decreased, causing the inner layers to extend closer to the edges of the extruded film. Thus, in operation, by judicious adjustment of the adjusting screws 22 and 23, the desired distribution of the inner layers is readily achieved. By turning the adjusting screw 22 into the housing portion 16 and turning the adjusting screw 23 to remove it from the housing portion 16, the sleeve or restrictor 33 can be forced into engagement with the terminal portion of the bushing 61 to bring the inner materials substantially to the outer edge of the extruded film. When the adjusting screws are operated in the opposite manner, that is adjusting screw 23 is forced into the body 16 and the adjusting screw 22 is removed, the action of the conical point 37 on the camming surface 35 causes the sleeve 33 to be removed from the bushing 61 and the edges of the extruded film will be primarily material from plenum 57, whereas the material from the inlet 15 and the plenum 80 will be more centrally disposed within the film.

By way of further illustration a composite film is prepared employing an adaptor substantially as illustrated in FIGURE 1 wherein a first extruder, supplying a heat-plastified composition consisting of 93.75 parts by weight of a copolymer of 85 weight percent vinylidene chloride and 15 weight percent vinyl chloride, 4.5 parts by weight of acetyl tributyl citrate, one part by weight of epoxidized soya bean oil commercially available under the trade designation of Paraplex G60, 0.7 part by weight of 4-tertiarybutyl salol, is in communication with the end 15 of the passage 13. A second extruder is connected to the passageway 81 and supplies a heat-plastified copolymer of 72 weight percent of ethylene and 28 weight percent vinyl acetate having a melt index of 3. A third extruder is connected to the passageway 59 and provides a heat-plastified stream of polyethylene having a density of 0.930, and a melt index of 3.8. A slot or sheeting die is connected to the outlet end 14 of passageway 13 and is oriented to position the extrusion slot parallel to the elongate openings of the bushings 61 and 88. The resultant film has a thickness of about 4.2 mils, the outside layers of polyethylene are about 1.7 mils in thickness. The central layer of vinylidene chloride polymer has a thickness of about 0.42 mil, and the intermediate layers of the ethylenevinyl acetate copolymers are about 0.1 mil in thickness. Adjustment of the sleeve 33 within the passage 13 results in variation of the constriction of the space of 44 and disposes the central elongated portion of heat-plastified composite stream in passageway 13 provides ready control of the width of the polyethylene selvages from a fraction of an inch to several inches.

Although the apparatus of the present invention depicted in FIGURE 1 employs a sleeve disposed within the central passageway to vary the configuration of the composite stream, the method of the invention may be practiced employing other apparatus wherein adjustable restrictor pins are moveably positioned adjacent the discharge end of the bushing, and the restrictor pins serve to decrease the spacing between the bushing and the wall of the passage such as the passage 13. Alternately, the position of the bushing may be altered relative to a conical wall of the passageway 13 to provide a similar restricting effect.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention excepting as it is set forth and defined in the hereto appended claims.

What is claimed is:

1. An extrusion adaptor suited to provide connection between two or more sources of heat-plastified synthetic resinous materal and a sheeting die, the adaptor comprising a housing defining a first pasageway, the first passageway a polymer inlet end and a polymer outlet end, the outlet end being adapted to provide cooperative communication with a sheeting die, the housing defining at least one generally annular plenum, a second polymer inlet passageway in communication with the annular plenum an annular passageway communicating with the first passageway and the annular plenum and adapted to supply material to the first passageway by radially inward flow from the annular plenum, a bushing disposed within the first passageway, the bushing defining a bushing passageway, the bushing passageway having an orifice of a generally elongate cross-sectional configuration in a plane normal to the axis of the first passageway and the elongate orifice disposed adjacent the outlet end of the first passageway and disposed between the outlet end of the first passageway and the annular passageway, the bushing passageway providing communication between the discharge end of the first passageway and the inlet end of the first passageway, a generally annular space defined between the bushing and the housing, the space extending from the annular passageway toward the outlet end and permitting material flow from the annular passageway to the elongate orifice of the bushing passageway, a restriction means adjustably mounted adjacent the elongate orifice of the bushing and an adjustment adapted to selectively constrict a space defined between the bushing and the inner wall of the central passageway.

2. The apparatus of claim 1 wheerin the restriction means is a sleeve slidably mounted within the first passageway.

3. An apparatus of claim 1 wherein the first passageway has a generally circular configuration between the annular passageway, and the discharge of the first passageway.

4. The apparatus of claim 1 wherein the housing defines a pair of generally opposed threaded radially extending apertures, a pair of adjusting screws disposed within the apertures, the restriction means comprising a sleeve having a generally annular collar disposed thereon, the sleeve being slidably positioned within the first passage generally adjacent to the discharge end of the first passageway, the annular collar defining an opposed pair of camming surfaces adapted to engage the adjustment screws and axially position the sleeve within the passage.

5. The apparatus of claim 1 wherein the housing defines at least two annular plenums and two annular passageways and contains at least two bushings, each of the bushings having a discharge opening elongate cross-section, each of the elongate discharge openings being generally in parallel relationship, each of the annular plenums being adapted to receive a heat-plastified synthetic material.

6. The apparatus of claim 1 wherein the body comprises the plurality of portions, and the annular plenum is defined by means of adjacent body positions.

References Cited

UNITED STATES PATENTS

| 3,308,508 | 3/1967 | Schrenk. |
| 3,315,306 | 4/1967 | Ladner et al. |
| 3,321,803 | 5/1967 | Corbett. |
| 3,327,349 | 6/1967 | Lennox. |
| 3,334,382 | 8/1967 | Lefevre. |

WILLIAM J. STEPHENSON, Primary Examiner